United States Patent [19]

January

[11] Patent Number: 5,388,057
[45] Date of Patent: Feb. 7, 1995

[54] APPARATUS AND METHOD FOR DETERMINING SHIM CHANGES TO ADJUST CAMBER AND CASTER OF VEHICLE WHEEL

[75] Inventor: Daniel B. January, St. Peters, Mo.

[73] Assignee: Hunter Engineering Company, Bridgeton, Mo.

[21] Appl. No.: 73,762

[22] Filed: Jun. 8, 1993

[51] Int. Cl.6 .................. G01B 11/275; G01B 5/24
[52] U.S. Cl. ........................ 364/551.01; 364/424.01; 356/155
[58] Field of Search ............... 364/559, 551.01, 571.04, 364/571.05, 424.01, 425, 550; 356/155, 388, 392, 399, 152

[56] References Cited

U.S. PATENT DOCUMENTS

| | | | |
|---|---|---|---|
| Re. 33,144 | 1/1990 | Hunter et al. | 356/152 |
| 4,381,548 | 4/1983 | Grossman et al. | 364/551 |
| 4,718,759 | 1/1988 | Butler | 356/152 |
| 4,879,670 | 11/1989 | Colarelli, III | 364/559 |
| 4,883,287 | 11/1989 | Murakami et al. | 280/665 |
| 4,957,308 | 9/1990 | Takizawa | 280/666 |
| 5,208,646 | 5/1993 | Rogers et al. | 356/152 |

*Primary Examiner*—Kevin J. Teska
*Assistant Examiner*—Stephen J. Walder, Jr.
*Attorney, Agent, or Firm*—Polster, Lieder, Woodruff & Lucchesi

[57] ABSTRACT

Apparatus for determining shim changes to adjust the camber and caster of a vehicle wheel includes a memory for storing preselected information relating to dimensions of a vehicle wheel control arm for at least two different vehicles, the information being different for the two vehicles. The memory also stores vehicle wheel alignment specifications for the vehicles. Vehicle wheel alignment instruments measure the camber and caster of vehicle wheels. A computer is operatively connected to the memory and is responsive to the measurements from the vehicle wheel alignment instruments for comparing the measured camber and caster to corresponding caster and camber specifications for the vehicle wheel to determine required changes in camber and caster. The computer uses the required changes and the preselected dimensional information to determine the changes required in shims to adjust the measured camber and caster to the specifications. An output device informs a user of the shim changes required to adjust the measured camber and caster to the specifications.

31 Claims, 4 Drawing Sheets

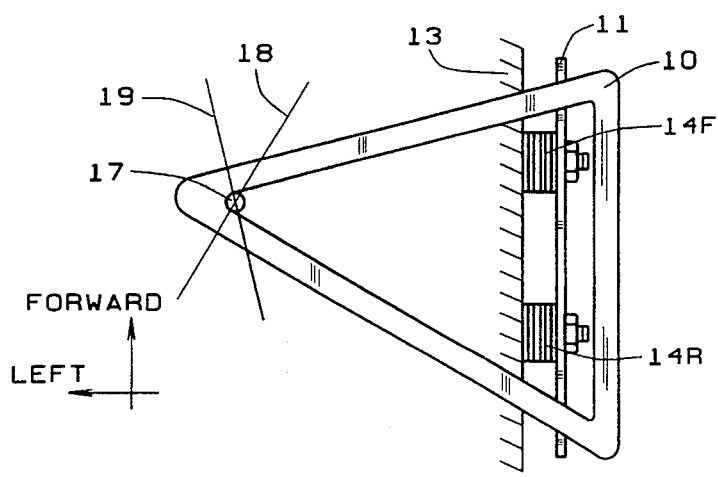
FIG. 6
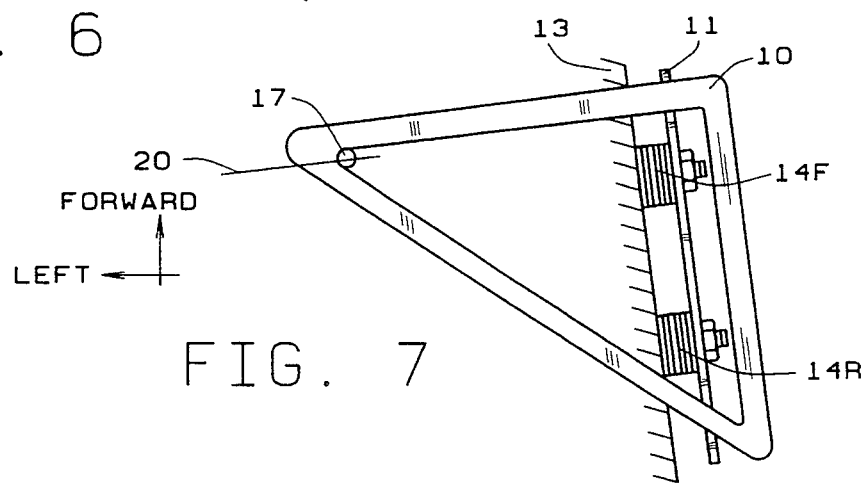
FIG. 7
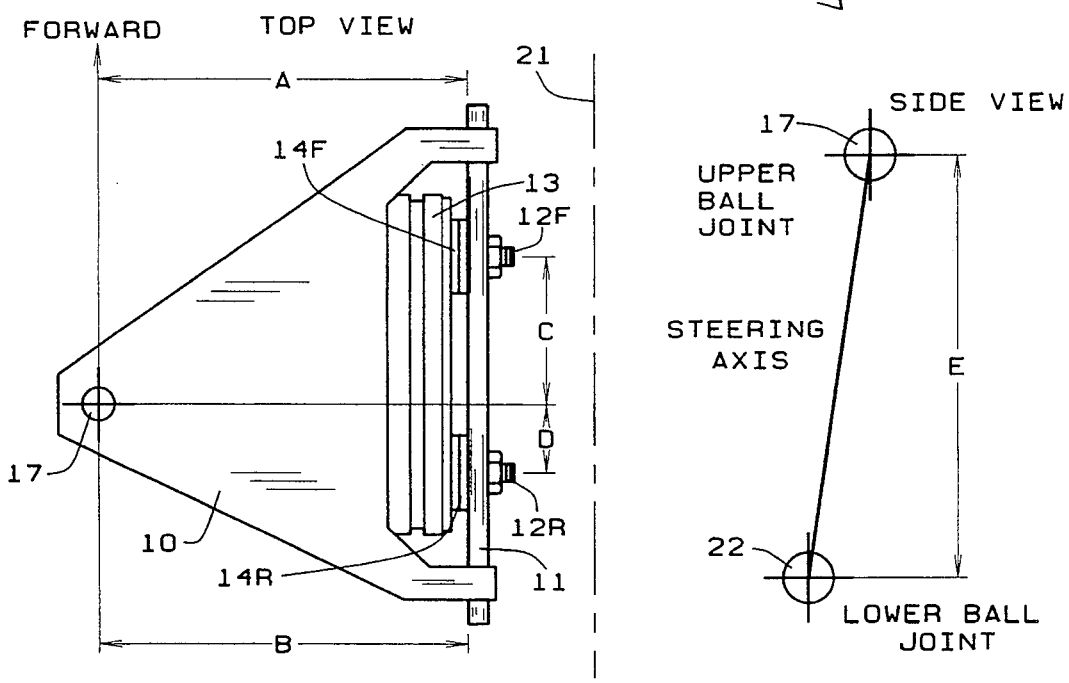
FIG. 8A
FIG. 8B

APPARATUS AND METHOD FOR DETERMINING SHIM CHANGES TO ADJUST CAMBER AND CASTER OF VEHICLE WHEEL

BACKGROUND OF THE INVENTION

The present invention relates to vehicle wheel alignment, and more particularly to vehicle wheel alignment systems for use with vehicles which utilize shims to simultaneously adjust the camber and caster of a steerable wheel on a vehicle.

U.S. Pat. No. 4,381,548 to Grossman and January describes a wheel alignment system which, inter alia, performs computations to determine the shims required to adjust caster and camber. That patent states:

"The inboard mounting points of the upper control arms are adjusted by washer-like shims. Changing equal shims at both mounting points changes camber, but not caster, while adding shims at one mounting point while removing equal shims from the other, changes caster but not camber. The shims are approximately calculated such that a one-sixteenth (1/16) inch thick shim change, equal at both mounting points of the control arm, produces a one-fourth (¼) degree camber change; and a one-thirty second (1/32) inch thick shim change, equal and opposite at both mounting points of the control arm, produces a one-half (½) degree caster change. From the camber and caster angles measured and the specifications entered, the computer 13 uses the above calculations to compute the net shim changes required."

However, as noted in the '548 patent, the computations are ". . . especially for General Motors type vehicles which use this shim method of adjustment." Large General Motors automobiles have used this method of adjusting camber and caster for many decades. General Motors pickup trucks use the method also, but have the control arm mounted "outboard" the frame while the automobile usually has it mounted "inboard" the frame, and so require shim removal where the automobiles require shim additions. In recent years, a smaller percentage of General Motors automobiles use this method of adjusting camber and caster, while an increasing percentage of small pickup trucks use it. It is especially common with imported trucks.

The wheel alignment system described in the '548 patent is of reduced benefit when aligning most vehicles which use front shims to adjust camber and caster, because the computations performed are only approximately correct. These vehicles differ in one or more of the four following ways when compared to the large GM automobiles for which the system was designed: (1) the control arms have different shapes; (2) the control arms have different dimensions; (3) the control arms may have a different orientation relative to the frame; and (4) the control arms may be mounted outboard the frame rather than inboard. Any of these differences is sufficient to make the approximation of the '548 system unacceptably inaccurate in computing the required shims to correct camber and/or caster.

SUMMARY OF THE INVENTION

Among the various objects and features of the present invention may be noted the provision of an improved wheel alignment system which more accurately computes the shims required to correct camber and/or caster of a vehicle wheel.

A second object is the provision of such a system which is usable for many different types of vehicles.

A third object is the provision of such a system which is easy to use.

A fourth object is the provision of such a system which provides improved correction of caster and camber for a large number of vehicles.

Other objects and features will be in part apparent and in part pointed out hereinafter.

Briefly, apparatus of the present invention is directed to determining shim changes to adjust the camber and caster of a vehicle wheel. The apparatus includes a memory for storing preselected information relating to dimensions of a vehicle wheel control arm for at least two different vehicles, the information being different for the two vehicles. The memory also stores vehicle wheel alignment specifications for the vehicles. Vehicle wheel alignment instruments measure the camber and caster of vehicle wheels. A computer operatively connected to the memory and responsive to the measurements from the vehicle wheel alignment instruments compares the measured camber and caster to corresponding caster and camber specifications for the vehicle wheel to determine required changes in camber and caster. The computer uses the required changes and the preselected dimensional information to determine the shim changes required to adjust the measured camber and caster to the specifications. An output device informs a user of the shim changes required to adjust the measured camber and caster to the specifications.

The method of the present invention includes storing preselected information relating to dimensions of a vehicle wheel control arm of at least two different vehicles, the preselected information being different for the two vehicles, in a digital computer. Alignment specifications for the vehicles are also stored in the digital computer. The camber and caster of a vehicle wheel are measured and, in the digital computer, the measured camber and caster are compared to corresponding alignment specifications to determine the required changes in camber and caster. The required changes and the control arm dimensional information are used to compute in the digital computer the shim changes required to adjust camber and caster. A user is visually informed of the shim changes required to adjust the measured caster and camber to the specifications.

BRIEF DESCRIPTION OF THE DRAWINGS

FIG. 6 is a plan view which shows how the asymmetry of the upper control arm affects the adjustment of camber and caster using the shims;

FIG. 7 is a plan view which shows how the non-squareness of the mounting of the upper control arm affects the adjustment of camber and caster using the shims;

FIG. 8A is a plan view which shows the dimensions to be measured to properly determine how to compute the shim changes;

FIG. 8B is a side view which shows more dimensions to be measured to properly determine how to compute the shim changes;

Similar reference characters indicate similar parts throughout the several views of the drawings.

DETAILED DESCRIPTION OF THE PREFERRED EMBODIMENT

It is preferred that the present invention be embodied in a computer controlled vehicle wheel alignment system 1, such as those shown in U.S. Pat. Nos. Re33,144 to Hunter et al. and 4,381,548 to Grossman and January, the disclosures of which are incorporated herein by reference. Alignment system 1 includes a console 2 suitably mounted on a stand for use by a technician/user 3. Console 2 includes a set of manually operable input keys or switches 4(A–D) and a display 5. Display 5 is preferably a CRT computer monitor type display.

Figure 1:
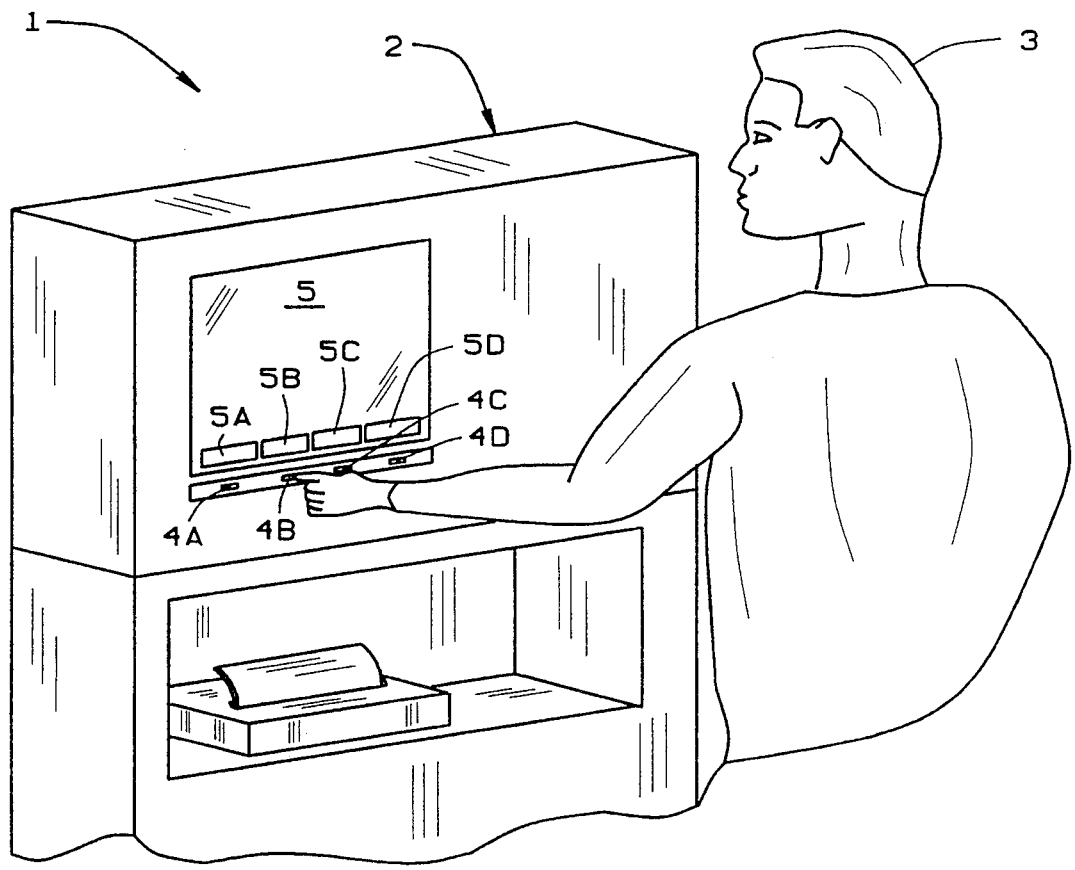
FIG. 1 is a perspective view of a vehicle alignment system console, with a technician/user, which includes the shim change determining apparatus of the present invention.
Figure 2:
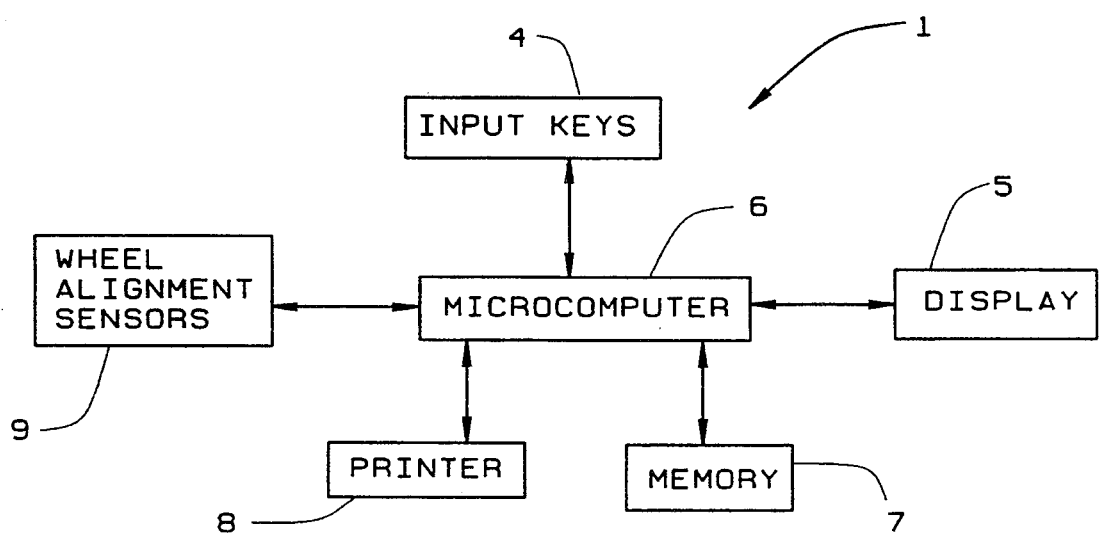
FIG. 2 is a block-diagram of the circuitry of the system of FIG. 1.

Input keys 4 and display 5 are connected to a microcomputer 6 (FIG. 2), which is also connected to a digital memory 7 and a printer 8. It should be understood that memory 7 could be internal to the microcomputer, depending upon the particular microcomputer used. Suitable alignment sensors 9 are also operatively connected to microcomputer 6 for supplying measured alignment information to the microcomputer. Such sensors are shown in the above-mentioned U.S. Patents, and in U.S. Pat. No. 4,879,670 to Colarelli, the disclosure of which is also incorporated herein by reference.

System 1 works interactively with the technician/user. This is done by means of display 5, which includes four variable function blocks 5A–5D (the display of which is controlled by microcomputer 6. Function blocks 5A–5D are disposed directly over corresponding switches 4A–4D and display to the user the function of those switches at that particular time in the program which controls the operation of microcomputer 6.

It is conventional for vehicle wheel alignment systems such as system 1 to have stored in memory 7 a database of vehicle specifications, including vehicle wheel alignment specifications, so that the alignment specifications of the vehicle under investigation are accessed for use upon identification to the system of the vehicle make, model, and year. The user identifies the vehicle make, model, and year interactive by use of keys 4 in combination with the display on screen 5 of lists of vehicles, arranged by make, model, and year.

Figure 3:
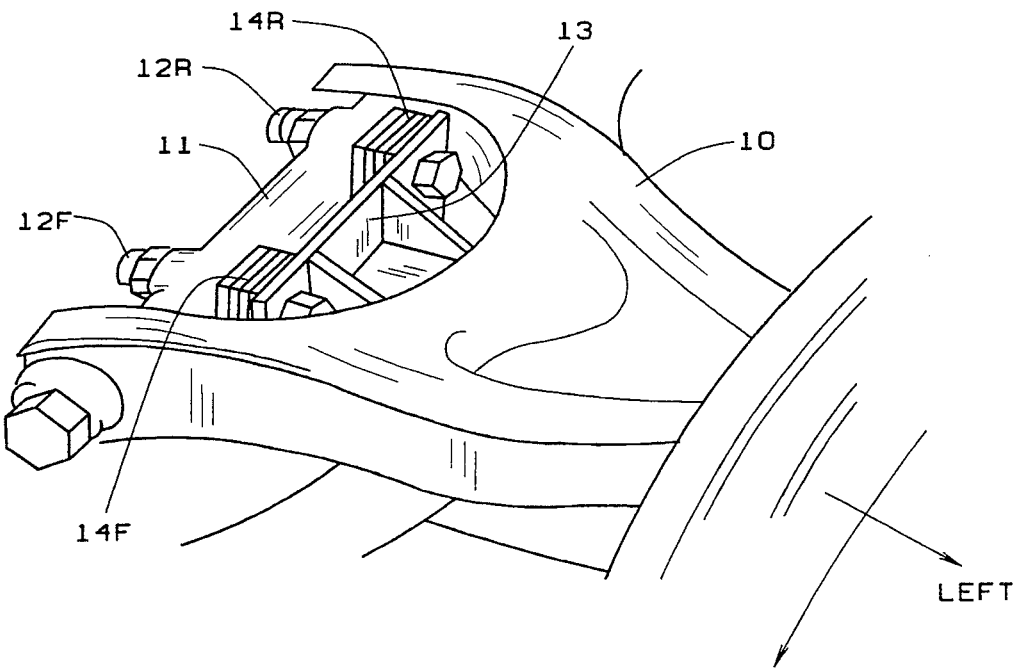
FIG. 3 is a perspective view which shows an upper control arm of the SLA-type suspension, illustrating the mounting of the control arm to the frame and the placement of shims between the mounting arm and the frame to affect the alignment of the control arm.

Turning to FIG. 3, there is shown an upper control arm 10 of an SLA-type suspension. Control arm 10 pivots about its mounting arm 11, which in turn is mounted to the vehicle frame 13 by mounting bolts 12F at the forward end and 12R at the rearward end. Between mounting arm 11 and vehicle frame 13 is a stack of shims 14F at the forward mounting bolt 12F and a stack of shims 14R at the rearward mounting bolt 12R.

Figure 4:
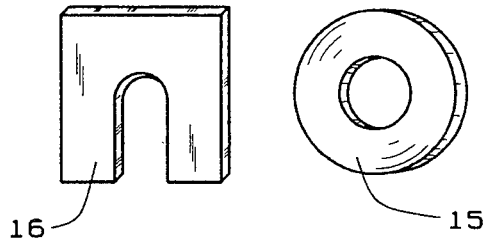
FIG. 4 is a perspective view which shows two types of front shims.

The shims may be of two types, which are shown in FIG. 4. One type, labeled 15, is simply a round washer. This type is most often installed in the vehicle factory where it is easy to mount a shim which requires the removal of the control arm mounting bolt 12F or 12R. The other type, labeled 16, is most often installed for an after-market adjustment, because it does not require the removal of the mounting bolt 12F or 12R—the bolt may simply be loosened and the shim may be slipped into or out of position between the mounting arm 11 and frame 13.

Figure 5A:
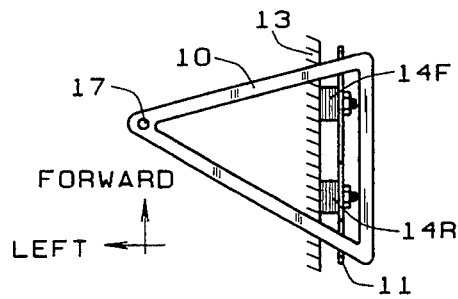
FIGS. 5A–5D are plan views which show several configurations of upper control arms in common use.
Figures 5B, 5C, 5D:
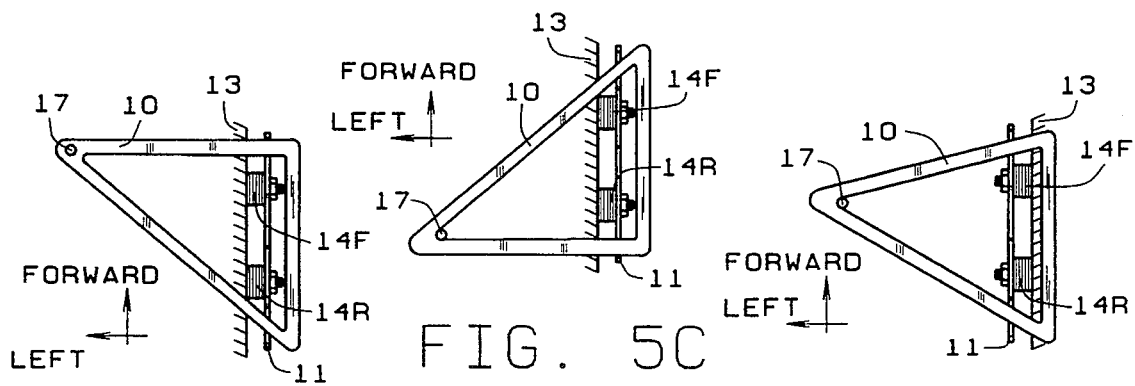

FIGS. 5A–5D show four different configurations of upper control arms. The arms shown are all for the left front wheel. FIG. 5A shows a control arm which resembles an isosceles triangle, with the upper ball joint 17 of the wheel spindle at the apex of the triangle. The mounting arm 11 is mounted "inboard" the frame rail 13. The upper control arm of FIG. 5B is similar to that of FIG. 5A, except that the shape of the control arm is not an isosceles triangle. Instead, the upper control arm of FIG. 5B has the upper ball joint 17 roughly in line with the front shims 14F. Similarly, in FIG. 5C, the upper ball joint 17 is roughly in line with the rear shims 14R. The configuration of FIG. 5D is similar to that of FIG. 5A, except that the mounting arm 11 is mounted "outboard" the frame rail 13. Other configurations, such as one with the mounting arm 11 not parallel to the center line of the vehicle, are of course possible.

FIG. 6 illustrates how the asymmetry of the upper control arm 10 affects the location of the upper ball joint 17 when shims are added or removed. When a shim is removed from the front shim stack 14F, the forward end of the mounting arm moves to a more outboard position, and the upper ball joint 17 moves more to the rear along arc 18. The pivot point for this movement is approximately the point of contact of the rear shim stack 14R with the mounting arm 11. Similarly, the removal or addition of a shim in the rear shim stack 14R causes the upper ball joint to move along arc 19, which is centered about the point of contact of the front shim stack 14F with the control arm 11. Note the lack of symmetry of arc 18 with arc 19. An equal but opposite change of shims at shim stack 14F and 14R does not produce the desired effect of changing caster but not camber.

FIG. 7 shows how the non-squareness of the mounting of the upper control arm 10 affects the location of the upper ball joint 17 when shims are added or removed. When shims are equally removed from both shim stacks 14F and 14R, the upper ball joint 17 moves outward along line 20, thus displacing the upper ball joint 17 outward, which affects camber, and rearward, which affects caster. This does not produce the desirable effect of changing camber but not caster.

It should be apparent from the above discussion that the shape of the upper control arm 10 and the orientation of its mounting arm 11 to the frame 13 is variable in nature, and varies from one vehicle design to another.

FIG. 8A and 8B illustrate the dimensions which must be known such that the control arm configuration can be treated in a generic manner and the shim changes computed accurately. Dimension "A" is measured from the center of the upper ball joint 17 to the surface of the mounting arm 11, which touches the shims at the forward mounting bolt 12F. The dimension is measured in a horizontal plane and in a direction which is perpendicular to the vehicle center line 21. Dimension "B" is measured from the center of the upper ball joint 17 to the surface of the mounting arm 11 which touches the shims at the rearward mounting bolt 12R. This dimension is measured in a horizontal plane and in a direction which is perpendicular to the vehicle center line 21.

Dimension "C" is measured from the center of the upper ball joint 17 to the surface of the mounting arm 11 which touches the shims at the forward mounting bolt 12F. The dimension is measured in a horizontal plane and in a direction which is parallel to the vehicle center line 21. Dimension "D" is measured from the center of the upper ball joint 17 to the surface of the mounting arm 11 which touches the shims at the rearward mounting bolt 12R. The dimension is measured in a horizontal plane and in a direction which is parallel to the vehicle center line 21.

Dimension "E" (FIG. 8B) is measured from the center of the upper ball joint to the center of the lower ball joint of the wheel spindle. The dimension is measured in a vertical plane which is parallel to the vehicle center line, and is the vertical distance between horizontal planes containing the upper and lower ball joints respectively.

It must also be known whether or not the mounting arm 11 is inboard or outboard the frame rail 13. If this condition and the dimensions A, B, C, D, and E are known, the computations of the shim changes required at shim stacks 14F and 14R may be performed with greater accuracy. The derivation of these computations now follows. This derivation assumes that the mounting arm 11 is inboard the frame, although a similar derivation is applicable for control arms having the mounting arm outboard the vehicle frame.

Figure 9:
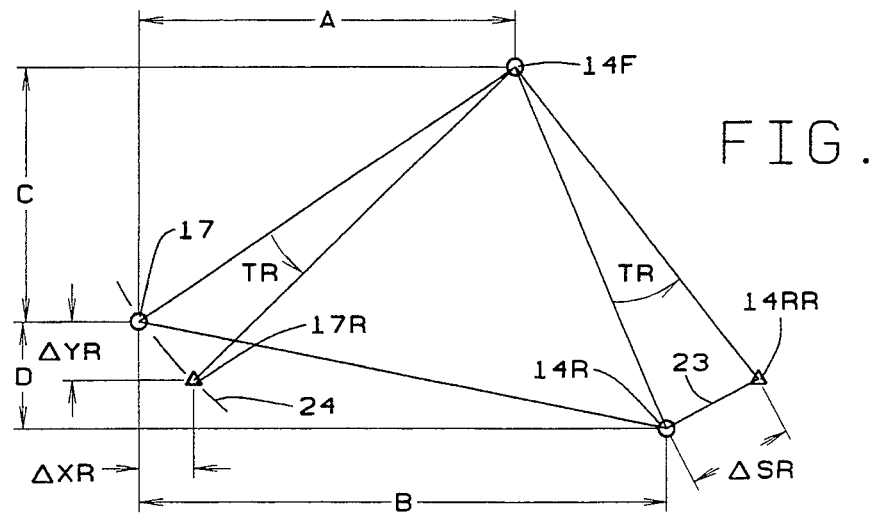
FIG. 9 is a plan view showing how the location of the upper ball joint changes when the front shim stack changes.

FIG. 9 is a plan view which shows the upper control arm 10 as a triangle. At the left corner is the upper ball joint 17. At the upper corner is the front shim stack 14F. At the lower corner is the rear shim stack 14R. If the rear shim stack 14R is increased in thickness by the amount $\Delta SR$, the upper control arm 10 rotates counter clockwise about the front shim stack 14F through angle TR, which moves the rear shim stack 14R along arc 23 to a new position 14RR, and moves the upper ball joint 17 along arc 24 to a new position 17R. The resulting change in its X (left-right) dimension (labeled $\Delta XR$) produces a change in camber, while the change in its Y (fore-aft) location (labeled $\Delta YR$) produces a change in caster.

Figure 10:
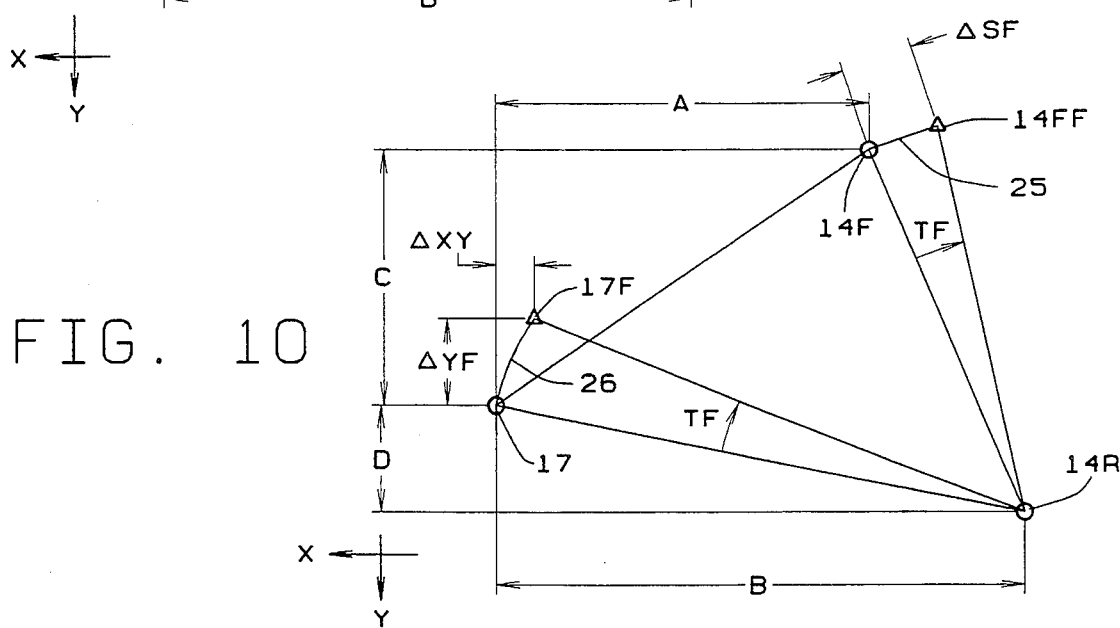
FIG. 10 is a plan view showing how the location of the upper ball joint changes when the rear shim stack changes.

FIG. 10 is a plan view which is similar to FIG. 9. In it, the front shim stack 14F is increased in thickness by the amount $\Delta SF$, causing the upper control arm 10 to rotate clockwise about the rear shim stack 14R through angle TF, which moves the front shim stack 14F along arc 25 to a new position 14FF, and moves the upper ball joint 17 along arc 26 to a new position 17F. The resulting change in its X (left-right) dimension (labeled $\Delta XF$) produces a change in camber, while the change in its Y (fore-aft) location (labeled $\Delta YF$) produces a change in caster.

Figure 11:
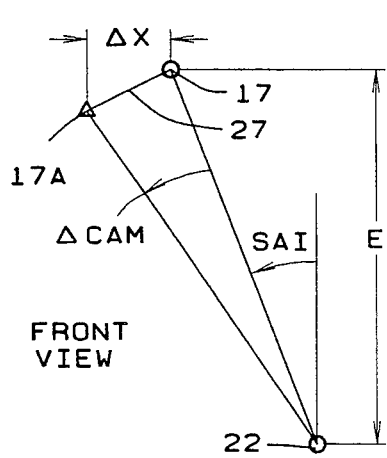
FIG. 11 is a front view showing how the movement of the upper ball joint affects camber.
Figure 12:
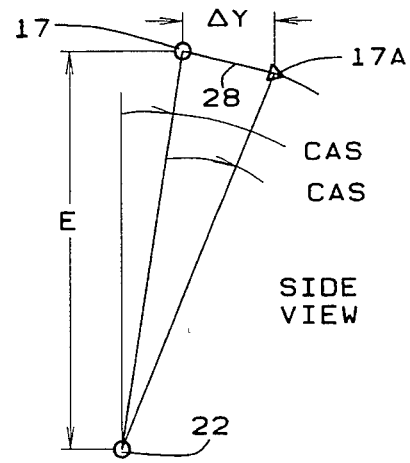
FIG. 12 is a side view showing how the movement of the upper ball joint affects caster.

Normally, changes are required to both shim stacks 14F and 14R. This produces a net change in position of the upper ball joint 17 to position 17A, as shown in FIG. 11 and FIG. 12. FIG. 11 shows how the net change in the X direction produces a change in camber $\Delta CAM$ as the upper ball joint 17 moves along arc 27 to position 17A. Similarly, FIG. 12 shows how the net change in the Y direction produces a change in caster $\Delta CAS$ as the upper ball joint 17 moves along arc 28 to position 17A.

$\Delta CAM$ and $\Delta CAS$ are known to the alignment system as the differences between the measurements and corresponding specifications of caster and camber, respectively. The goal of the computations is to produce the required shim pack changes $\Delta SF$ and $\Delta SR$ as a function of $\Delta CAM$, $\Delta CAS$, and the size, configuration, and orientation of the upper control arm 10 and its mounting arm 11. As is readily apparent from the drawings, this is algebraically complicated—it involves three-dimensional geometry and the solving of two simultaneous equations in two unknowns ($\Delta SF$ and $\Delta SR$) which contain trigonometric functions. This type of problem can be quite formidable.

It has been found, however, that due to relative dimensions involved an approximation using the dimensions discussed above in connection with FIGS. 8A and 8B provides extremely accurate results even without solving the relevant equations exactly. Because the rotational and translational changes of the control arm 10 are generally small relative to dimensions A, B, C, D, and E (hereinafter, the A-E dimensions), the errors in these approximations are small, and can be safely ignored. The A-E dimensions can be used to determine four approximate derivatives, as follows:

$\frac{dCAM}{dSF}$ = the rate of change of camber with respect to a change in the front shims $\frac{dCAM}{dSR}$ = the rate of change of camber with respect to a change in the rear shims $\frac{dCAS}{dSF}$ = the rate of change of caster with respect to a change in the front shims $\frac{dCAS}{dSR}$ = the rate of change of caster with respect to a change in the rear shims The core assumption is that, since the changes to be made are very small relative to the A-E dimensions, these derivatives can be treated as constants which depend only on the A-E dimensions. If the front and rear shim packs are changed, the net changes in camber and caster ($\Delta CAM$ and $\Delta CAS$, respectively) can be computed as:

$$\Delta CAM \approx \frac{dCAM}{dSF} \Delta SF + \frac{dCAM}{dSR} \Delta SR$$

$$\Delta CAS \approx \frac{dCAS}{dSF} \Delta SF + \frac{dCAS}{dSR} \Delta SR$$

These are two linear equations in two unknowns with constant coefficients (the constant derivatives), which can be easily solved by numerous standard and well-known methods. The constant derivatives are determined as a function of the A-E dimensions as follows: Referring to FIG. 9, to derive the X and Y changes due to the change in the rear shim stack 14R, an assumption is made that $\Delta SR$ is approximately equal to the length of the arc section labeled 25. As before, the shim changes required are usually small compared to the distance between the front shim stack 14F and the rear shim stack 14R, and so this is quite reasonable. Using the formula for computing the length of an arc as a function of the radius and the angle, the rotation angle TR caused by the shim change ΔSR is easily computed:

$$TR \approx \frac{\Delta SR}{\sqrt{(B-A)^2 + (C+D)^2}}$$

The "X" change, which affects camber, is computed by:

$$\Delta XR = \sqrt{A^2 + C^2} \cos\left(TR + \tan^{-1}\frac{C}{A}\right) - A$$

Similarly, the "Y" change, which affects caster, is computed by:

$$\Delta YR = \sqrt{A^2 + C^2} \sin\left(TR + \tan^{-1}\frac{C}{A}\right) - C$$

Using the approximations for TR, these expand to:

$$\Delta XR \approx \sqrt{A^2 + C^2} \cos\left(\frac{\Delta SR}{\sqrt{(B-A)^2 + (C+D)^2}} + \tan^{-1}\frac{C}{A}\right) - A$$

$$\Delta YR \approx \sqrt{A^2 + C^2} \sin\left(\frac{\Delta SR}{\sqrt{(B-A)^2 + (C+D)^2}} + \tan^{-1}\frac{C}{A}\right) - C$$

Now turning to FIG. 10 and the derivation of the X and Y changes due to the change in the front shim stack 14F, and assumption is made that ΔSF is approximately equal to the length of the arc section labeled 25. The shim changes required are usually small compared to the distance between the front shim stack 14F and the rear shim stack 14R, and so this is quite reasonable. Again using the formula for computing the length of an arc as a function of the radius and the angle, the rotation angle TF caused by the shim change ΔSF is easily computed:

$$TF \approx \frac{\Delta SF}{\sqrt{(B-A)^2 + (C+D)^2}}$$

The "X" change, which affects camber, is computed by:

$$\Delta XF = \sqrt{B^2 + D^2} \cos\left(TF + \tan^{-1}\frac{D}{B}\right) - B$$

Similarly, the "Y" change, which affects caster, is computed by:

$$\Delta YF = -\sqrt{B^2 + D^2} \sin\left(TF + \tan^{-1}\frac{D}{B}\right) + D$$

These expand to:

$$\Delta XF \approx \sqrt{B^2 + D^2} \cos\left(\frac{\Delta SF}{\sqrt{(B-A)^2 + (C+D)^2}} + \tan^{-1}\frac{D}{B}\right) - B$$

$$\Delta YF \approx -\sqrt{B^2 + D^2} \sin\left(\frac{\Delta SF}{\sqrt{(B-A)^2 + (C+D)^2}} + \tan^{-1}\frac{D}{B}\right) + D$$

The net changes in the X and Y directions experienced by the upper ball joint 17 are:

$$\Delta X = \Delta XF + \Delta XR$$

$$\Delta Y = \Delta YF + \Delta YR$$

These expand to:

$$\Delta X \approx \sqrt{B^2 + D^2} \cos\left(\frac{\Delta SF}{\sqrt{(B-A)^2 + (C+D)^2}} + \tan^{-1}\frac{D}{B}\right) - B + \sqrt{A^2 + C^2} \cos\left(\frac{\Delta SR}{\sqrt{(B-A)^2 + (C+D)^2}} + \tan^{-1}\frac{C}{A}\right) - A$$

$$\Delta Y \approx -\sqrt{B^2 + D^2} \sin\left(\frac{\Delta SF}{\sqrt{(B-A)^2 + (C+D)^2}} + \tan^{-1}\frac{D}{B}\right) + D + \sqrt{A^2 + C^2} \sin\left(\frac{\Delta SR}{\sqrt{(B-A)^2 + (C+D)^2}} + \tan^{-1}\frac{C}{A}\right) - C$$

It can be seen in FIG. 11 that the original SAI (steering axis inclination) angle determines how the X change ΔX affects camber. The change in camber is:

$$\Delta CAM \approx \frac{\frac{\Delta X}{\cos(SAI)}}{\frac{E}{\cos(SAI)}} \approx \frac{\Delta X}{E}$$

It can be seen in FIG. 12 that the original CAS (caster) angle determines how the Y change ΔY affects caster. The change in caster is:

$$\Delta CAS \approx \frac{\frac{\Delta Y}{\cos(CAS)}}{\frac{E}{\cos(CAS)}} \approx \frac{\Delta Y}{E}$$

These expand to:

$$\Delta CAM \approx$$

$$\frac{\sqrt{B^2 + D^2}}{E} \cos\left(\frac{\Delta SF}{\sqrt{(B-A)^2 + (C+D)^2}} + \tan^{-1}\frac{D}{B}\right) - \frac{B}{E} +$$

$$\frac{\sqrt{A^2 + C^2}}{E} \cos\left(\frac{\Delta SR}{\sqrt{(B-A)^2 + (C+D)^2}} + \tan^{-1}\frac{C}{A}\right) - \frac{A}{E}$$

$$\Delta CAS \approx$$

$$\frac{-\sqrt{B^2 + D^2}}{E} \sin\left(\frac{\Delta SF}{\sqrt{(B-A)^2 + (C+D)^2}} + \tan^{-1}\frac{D}{B}\right) +$$

$$\frac{D}{E} +$$

$$\frac{\sqrt{A^2 + C^2}}{E} \sin\left(\frac{\Delta SR}{\sqrt{(B-A)^2 + (C+D)^2}} + \tan^{-1}\frac{C}{A}\right) - \frac{C}{E}$$

Now the derivatives can be determined:

$$\frac{dCAM}{dSF} \approx$$

$$\frac{-\sqrt{B^2 + D^2}}{E\sqrt{(B-A)^2 + (C+D)^2}} \sin\left(\frac{\Delta SF}{\sqrt{(B-A)^2 + (C+D)^2}} + \tan^{-1}\frac{D}{B}\right)$$

$$\frac{dCAM}{dSR} \approx$$

$$\frac{-\sqrt{A^2 + C^2}}{E\sqrt{(B-A)^2 + (C+D)^2}} \sin\left(\frac{\Delta SR}{\sqrt{(B-A)^2 + (C+D)^2}} + \tan^{-1}\frac{C}{A}\right)$$

$$\frac{dCAS}{dSF} \approx$$

$$\frac{-\sqrt{B^2 + D^2}}{E\sqrt{(B-A)^2 + (C+D)^2}} \cos\left(\frac{\Delta SF}{\sqrt{(B-A)^2 + (C+D)^2}} + \tan^{-1}\frac{D}{B}\right)$$

$$\frac{dCAS}{dSR} \approx$$

$$\frac{\sqrt{A^2 + C^2}}{E\sqrt{(B-A)^2 + (C+D)^2}} \cos\left(\frac{\Delta SR}{\sqrt{(B-A)^2 + (C+D)^2}} + \tan^{-1}\frac{C}{A}\right)$$

The derivatives are determined as constants which depend only on the dimensions of the upper control arm 10 and its dimensions A–E by computing their values when $\Delta SF=0$ and $\Delta SR=0$, that is, when no shim changes have been made. The first value is computed as:

$$\frac{dCAM}{dSF} \approx \frac{-\sqrt{B^2 + D^2}}{E\sqrt{(B-A)^2 + (C+D)^2}} \sin\left(\tan^{-1}\frac{D}{B}\right)$$

$$\frac{dCAM}{dSF} \approx \frac{-\sqrt{B^2 + D^2}}{E\sqrt{(B-A)^2 + (C+D)^2}} \cdot \frac{D}{\sqrt{B^2 + D^2}}$$

$$\frac{dCAM}{dSF} \approx \frac{-D}{E\sqrt{(B-A)^2 + (C+D)^2}}$$

Similarly, the others are computed as:

$$\frac{dCAM}{dSR} \approx \frac{-C}{E\sqrt{(B-A)^2 + (C+D)^2}}$$

$$\frac{dCAS}{dSF} \approx \frac{-B}{E\sqrt{(B-A)^2 + (C+D)^2}}$$

$$\frac{dCAS}{dSR} \approx \frac{A}{E\sqrt{(B-A)^2 + (C+D)^2}}$$

Note that these four approximations of the derivatives depend only on the A–E dimensions of the upper control arm 10 and its mounting, as desired. Note further that the units of these derivatives are "radians/distance", where "distance" is in the units of measurements of the A–E dimensions. The reasonableness of these approximation is shown as follows:

If the front shim pack 14F is increased, camber does not change if dimension D is zero. This is reasonable, as the upper ball joint 17 moves only forward. If dimension D increases from zero, the upper ball joint 17 moves inward, resulting in a more negative camber, as predicted by the equations.

If the front shim pack 14F is increased, caster does not change if dimension B is zero. This is reasonable, as the upper ball joint 17 moves only inward. If dimension B increases from zero, the upper ball joint 17 moves forward, resulting in a more negative caster, as predicted by the equations.

If the rear shim pack 14R is increased, camber does not change if dimension C is zero. This is reasonable, as the upper ball joint 17 moves only rearward. If dimension C increases from zero, the upper ball joint 17 moves inward, resulting in a more negative camber, as predicted by the equations.

If the rear shim pack 14R is increased, caster does not change if dimension A is zero. This is reasonable, as the upper ball joint 17 moves only rearward. If dimension B increases from zero, the upper ball joint 17 moves rearward, resulting in a more positive caster, as predicted by the equations.

A more rigorous solution of such a problem is not required since the vehicle suspension itself does not allow for extreme accuracy. For example, note that the shims contact the frame and the mounting arm over a distributed area, yet are intended to change the angular relation between the two. This necessarily involves some distortion of the mounting arm, the shim, or the frame, or some combination of the three. More importantly, the actual A–E dimensions, as described above, are not known by the technician/user prior to the adjustment process, and it is not reasonable to expect a service technician to measure the A–E dimensions in a garage setting, as suitable instrumentation and time are not available. These dimensions can be determined by the vehicle manufacturers or by the manufacturers of the vehicle alignment system, and thus approximate values can be obtained for each model of vehicle which uses the shim method to adjust front camber and caster.

The present invention involves approximating the A–E dimensions for the vehicle under investigation and pre-storing either the dimensions or the computed derivatives along with other alignment specifications in the vehicle specification database in memory 7, which is already part of the alignment system. In this way, the information needed to more accurately compute the front shim changes required are recalled with the other alignment specifications in a routine manner.

Note further that this method allows easy identification of those vehicles which use the shim method of adjusting camber and caster. The display 5 is easily prevented from showing such computations for those vehicles for which the dimensional information is not present in the database.

The steps involved in using the system are:

The service technician identifies the vehicle to the system by make, model, and year, in the standard manner.

The system locates the vehicle in its specification database and recalls the alignment specifications along with the upper control arm dimensional information.

The service technician mounts the sensors on the vehicle wheels and measures the camber and caster angles in the usual manner.

The system used the four derivatives and the measured camber and caster angles to compute the front shim changes required.

The system displays the required changes on the display 5, and/or prints the required changes on the printer 8.

In view of the above it will be seen that the various objects and features of the invention are achieved, and other advantageous results obtained. It should be understood that the description contained herein is illustrative only and is not to be taken in a limiting sense. Particularly, it should be clearly understood that other computations may be performed which may or may not involve approximations without departing from the scope and spirit of the present invention.

What is claimed is:

1. Apparatus for determining shim changes to adjust the camber and caster of a vehicle wheel, the apparatus comprising:
   (a) a memory for storing preselected information relating to dimensions of a vehicle wheel control arm for at least two different vehicles, the information being different for said two vehicles, and for storing vehicle wheel alignment specifications for said vehicles;
   (b) vehicle wheel alignment instruments for measuring the camber and caster of vehicle wheels;
   (c) a computer operatively connected to the memory and responsive to the measurements from the vehicle wheel alignment instruments for comparing the measured camber and caster to corresponding caster and camber specifications for said vehicle wheel to determine required changes in camber and caster, and for using said required changes and compensation factors derived from selected actual control arm dimensions to determine the changes required in shims to adjust the measured camber and caster to the specifications; and
   (d) an output device to inform a user of the shim changes required to adjust the measured camber and caster to the specifications.

2. The shim change determining apparatus as set forth in claim 1 further including user operable means for entering the particular make and model of vehicle having its caster and camber adjusted, the computer being responsive to the entry of a particular make and model of vehicle by the user to use the alignment specifications and control arm information stored in the memory for that particular make and model of vehicle to determine the shim changes required to adjust the measured camber and caster to the specifications.

3. The shim change determining apparatus as set forth in claim 1 wherein the control arm dimension information includes selected actual control arm dimensions.

4. The shim change determining apparatus as set forth in claim 1 wherein the computer has programmed therein a linear model of the change of both caster and camber with respect to shim changes.

5. The shim change determining apparatus as set forth in claim 4 wherein the control arm has a set of front shims and a set of rear shims, and wherein the linear model includes a first model of the change of camber with respect to changes in the front and rear shims and a second model of the change of caster with respect to changes in the front and rear shims.

6. Apparatus for determining shim changes to adjust the camber and caster of a vehicle wheel, the apparatus comprising:
   (a) a memory for storing preselected information relating to dimensions of a vehicle wheel control arm for at least two different vehicles, the information being different for said two vehicles, and for storing vehicle wheel alignment specifications for said vehicles;
   (b) vehicle wheel alignment instruments for measuring the camber and caster of vehicle wheels;
   (c) a computer operatively connected to the memory and responsive to the measurements from the vehicle wheel alignment instruments for comparing the measured camber and caster to corresponding caster and camber specifications for said vehicle wheel to determine required changes in camber and caster, and for using said required changes and said preselected dimensional information to determine the changes required in shims to adjust the measured camber and caster to the specifications; and
   (d) an output device to inform a user of the shim changes required to adjust the measured camber and caster to the specifications;
   wherein the control arm dimension information includes compensation factors derived from selected actual control arm dimensions.

7. The shim change determining apparatus as set forth in claim 6 wherein said control arm has at least four compensation factors.

8. The shim change determining apparatus as set forth in claim 7 wherein the control arm has a set of front shims and a set of rear shims associated therewith, and wherein one of the compensation factors relates to the rate of change of camber with respect to a change in the front shims for said control arm.

9. The shim change determining apparatus as set forth in claim 7 wherein the control arm has a set of front shims and a set of rear shims associated therewith, and wherein one of the compensation factors relates to the rate of change of camber with respect to a change in the rear shims for said control arm.

10. The shim change determining apparatus as set forth in claim 7 wherein the control arm has a set of front shims and a set of rear shims associated therewith, and wherein one of the compensation factors relates to the rate of change of caster with respect to a change in the front shims for said control arm.

11. The shim change determining apparatus as set forth in claim 7 wherein the control arm has a set of front shims and a set of rear shims associated therewith, and wherein one of the compensation factors relates to the rate of change of caster with respect to a change in the rear shims for said control arm.

12. The shim change determining apparatus as set forth in claim 6 wherein the compensation factors are a function only of the selected actual control arm dimensions and are independent of the magnitude of the differences between measured alignment values and the specifications.

13. The shim change determining apparatus as set forth in claim 6 wherein the compensation factors are constants for a particular control arm.

14. Apparatus for determining shim changes to adjust the camber and caster of a vehicle wheel, the apparatus comprising:
   (a) a memory for storing preselected information relating to dimensions of a vehicle wheel control arm for at least two different vehicles, the information being different for said two vehicles, and for storing vehicle wheel alignment specifications for said vehicles:
   (b) vehicle wheel alignment instruments for measuring the camber and caster of vehicle wheels;
   (c) a computer operatively connected to the memory and responsive to the measurements from the vehicle wheel alignment instruments for comparing the measured camber and caster to corresponding caster and camber specifications for said vehicle wheel to determine required changes in camber and caster, and for using said required changes and said preselected dimensional information to determine the changes required in shims to adjust the measured camber and caster to the specifications; and
   (d) an output device to inform a user of the shim changes required to adjust the measured camber and caster to the specifications:
   wherein the computer has programmed therein a linear model of the change of both caster and camber with respect to shim changes, and wherein the linear model includes a plurality of compensation factors derived from actual control arm dimensions.

15. The shim change determining apparatus as set forth in claim 14 wherein the memory has stored therein a set of compensation factors for a plurality of different control arms, further including user operable means for selecting the particular vehicle type being adjusted, the computer being responsive to the selection of a particular vehicle type to use the compensation factors for the corresponding control arm in determining the shim changes required to adjust the measured camber and caster to the specifications.

16. The shim change determining apparatus as set forth in claim 14 wherein the computer determines the compensation factors from actual dimensions of said control arm stored in the memory.

17. A method for determining shim changes required to adjust the camber and caster of a vehicle wheel, the method comprising:
   (a) storing preselected information relating to actual dimensions of a vehicle wheel control arm of at least two different vehicles, the preselected information being different for said two vehicles, in a digital computer;
   (b) storing alignment specifications for said vehicles in said digital computer;
   (c) measuring the camber and caster of a vehicle wheel;
   (d) comparing in said digital computer said measured camber and caster to corresponding alignment specifications to determine the required changes in said camber and caster;
   (e) using said required changes and compensation factors derived from actual control arm dimensional information to compute in said digital computer the shim changes required to adjust said camber and caster; and
   (f) visually informing a user of the shim changes required to adjust the measured caster and camber to the specifications.

18. The method of determining shim changes as set forth in claim 17 further including manually entering the particular make and model of vehicle having its caster and camber adjusted, determining in the computer in response to the entry of a particular make and model of vehicle the shim changes required to adjust the measured camber and caster to the specifications, said computer using the alignment specifications and control arm information stored in the memory for that particular make and model of vehicle to determine said required shim changes.

19. The method of determining shim changes as set forth in claim 17 wherein the control arm dimension information includes selected actual control arm dimensions.

20. The method of determining shim changes as set forth in claim 17 wherein the computer has programmed therein a linear model of the change of both caster and camber with respect to shim changes.

21. The method of determining shim changes as set forth in claim 20 wherein the linear model includes a plurality of compensation factors.

22. The method of determining shim changes as set forth in claim 20 wherein the control arm has a set of front shims and a set of rear shims, and wherein the linear model includes a first model of the change of camber with respect to changes in the front and rear shims and a second model of the change of caster with respect to changes in the front and rear shims.

23. A method for determining shim changes required to adjust the camber and caster of a vehicle wheel, the method comprising:
   (a) storing preselected information relating to dimensions of a vehicle wheel control arm of at least two different vehicles, the preselected information being different for said two vehicles, in a digital computer;
   (b) storing alignment specifications for said vehicles in said digital computer;
   (c) measuring the camber and caster of a vehicle wheel:
   (d) comparing in said digital computer said measured camber and caster to corresponding alignment specifications to determine the required changes in said camber and caster;

(e) using said required changes and said control arm dimensional information to compute in said digital computer the shim changes required to adjust said camber and caster; and (f) visually informing a user of the shim changes required to adjust the measured caster and camber to the specifications;

wherein the control arm dimension information includes compensation factors derived from selected actual control arm dimensions.

24. The method of determining shim changes as set forth in claim 23 wherein said control arm has at least four compensation factors.

25. The method of determining shim changes as set forth in claim 24 wherein the control arm has a set of front shims and a set of rear shims associated therewith, and wherein one of the compensation factors relates to the rate of change of camber with respect to a change in the rear shims for said control arm.

26. The method of determining shim changes as set forth in claim 24 wherein the control arm has a set of front shims and a set of rear shims associated therewith, and wherein one of the compensation factors relates to the rate of change of caster with respect to a change in the front shims for said control arm.

27. The method of determining shim changes as set forth in claim 24 wherein the control arm has a set of front shims and a set of rear shims associated therewith, and wherein one of the compensation factors relates to the rate of change of caster with respect to a change in the rear shims for said control arm.

28. The method of determining shim changes as set forth in claim 24 wherein the control arm has a set of front shims and a set of rear shims associated therewith, and wherein one of the compensation factors relates to the rate of change of camber with respect to a change in the front shims for said control arm.

29. The method of determining shim changes as set forth in claim 23 wherein the compensation factors are a function only of the selected actual control arm dimensions and are independent of the magnitude of the differences between measured alignment values and the specifications.

30. The method of determining shim changes as set forth in claim 23 wherein the compensation factors are constants for a particular control arm.

31. A method for determining shim changes required to adjust the camber and caster of a vehicle wheel, the method comprising:

(a) storing preselected information relating to dimensions of a vehicle wheel control arm of at least two different vehicles, the preselected information being different for said two vehicles, in a digital computer;

(b) storing alignment specifications for said vehicles in said digital computer;

(c) measuring the camber and caster of a vehicle wheel;

(d) comparing in said digital computer said measured camber and caster to corresponding alignment specifications to determine the required changes in said camber and caster:

(e) using said required changes and said control arm dimensional information to compute in said digital computer the shim changes required to adjust said camber and caster; and (f) visually informing a user of the shim changes required to adjust the measured caster and camber to the specifications.

wherein the computer has programmed therein a linear model of the change of both caster and camber with respect to shim changes, said model including a plurality of compensation factors;.

wherein the computer determines the compensation factors from actual dimensions of said control arm stored in the memory.

* * * * *